Sept. 14, 1954   F. M. DARNER   2,688,804
ALIGNMENT MEANS FOR PIPE MANUFACTURING APPARATUS
Filed May 18, 1950   5 Sheets-Sheet 1
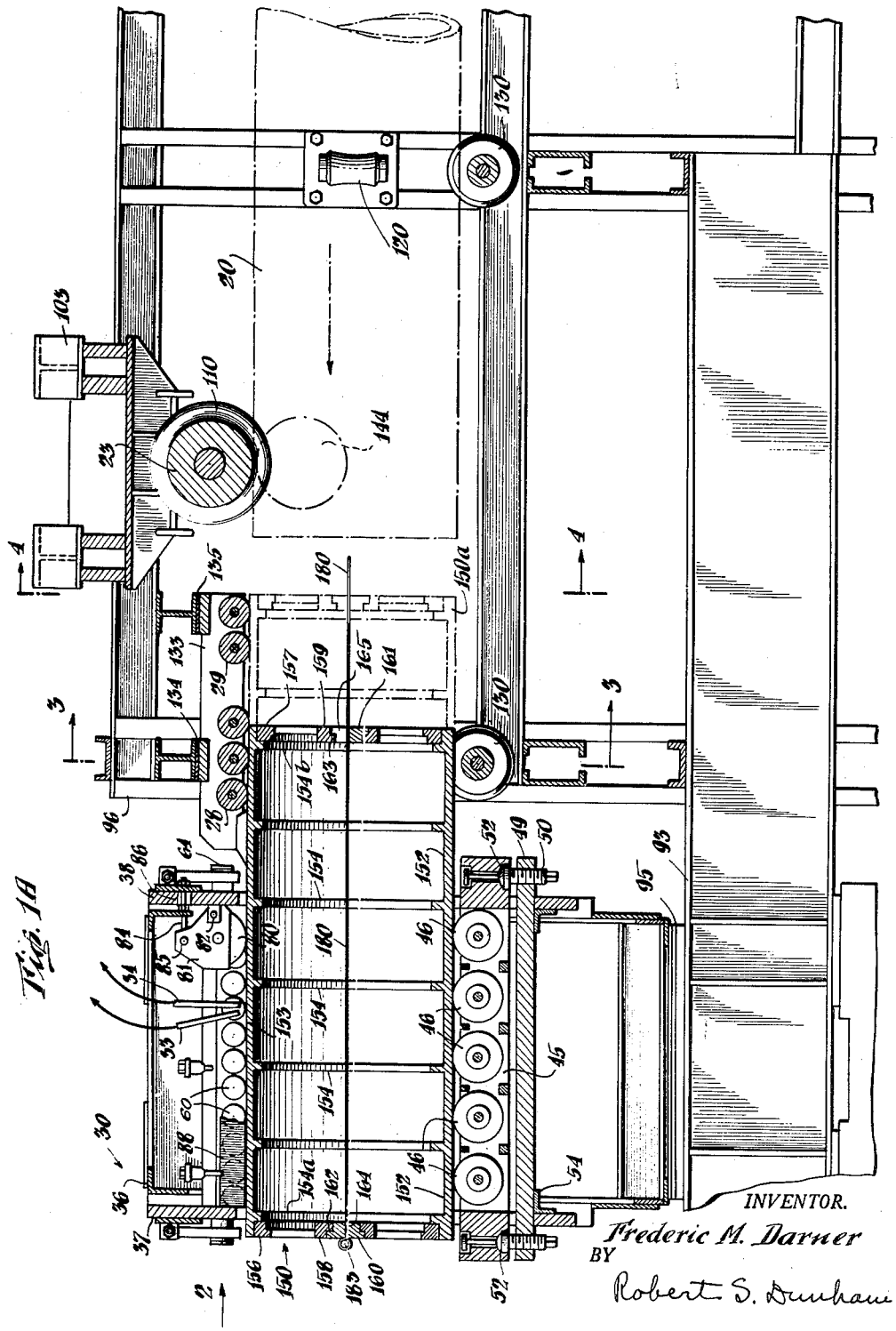
INVENTOR.
Frederic M. Darner
BY
Robert S. Dunham
ATTORNEY Sept. 14, 1954  F. M. DARNER  2,688,804
ALIGNMENT MEANS FOR PIPE MANUFACTURING APPARATUS
Filed May 18, 1950  5 Sheets-Sheet 2
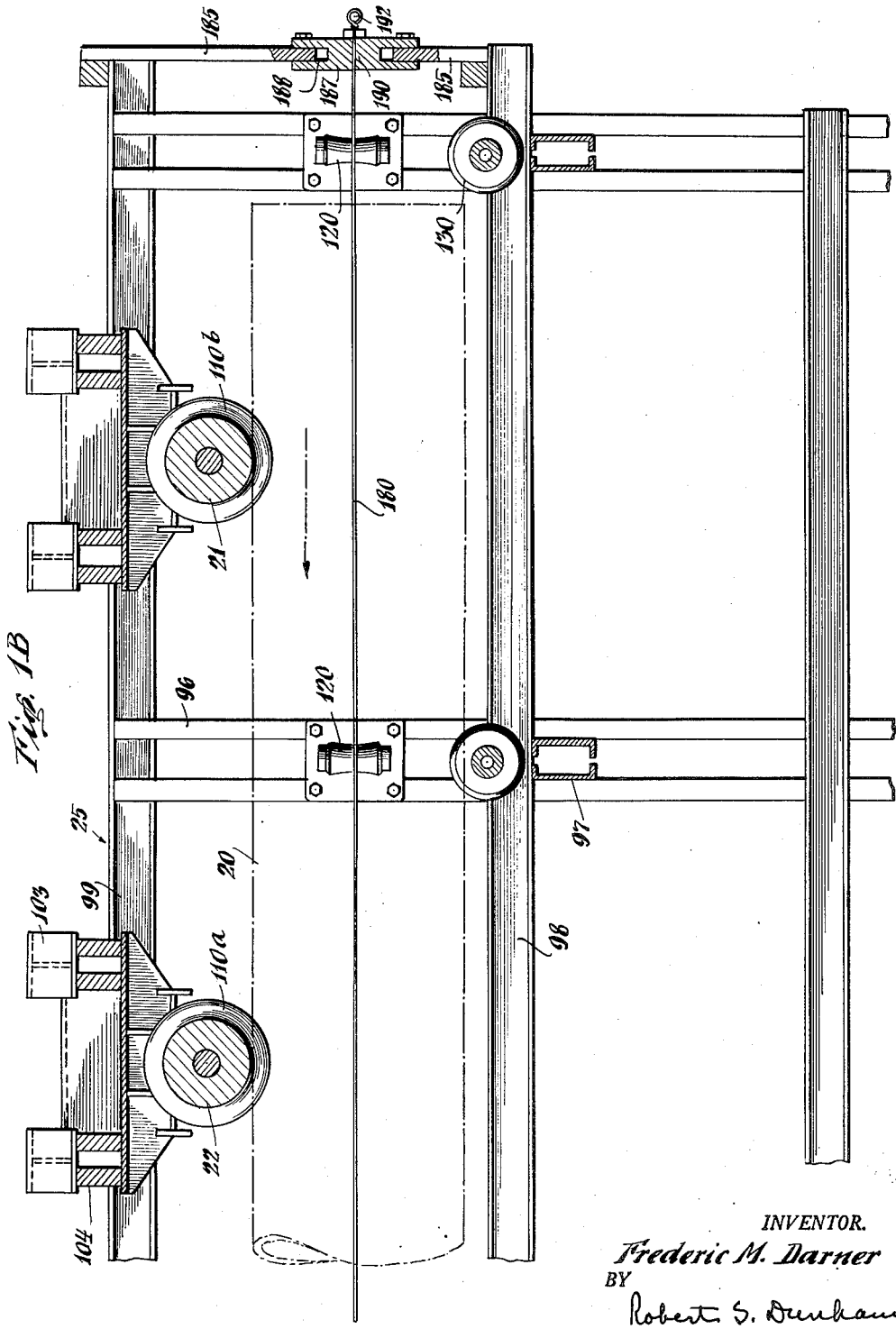
INVENTOR.
Frederic M. Darner
BY
Robert S. Dunham
ATTORNEY Sept. 14, 1954  F. M. DARNER  2,688,804
ALIGNMENT MEANS FOR PIPE MANUFACTURING APPARATUS
Filed May 18, 1950  5 Sheets-Sheet 3

INVENTOR.
Frederic M. Darner
BY
Robert S. Dunham
ATTORNEY

Sept. 14, 1954 F. M. DARNER 2,688,804
ALIGNMENT MEANS FOR PIPE MANUFACTURING APPARATUS
Filed May 18, 1950 5 Sheets-Sheet 4
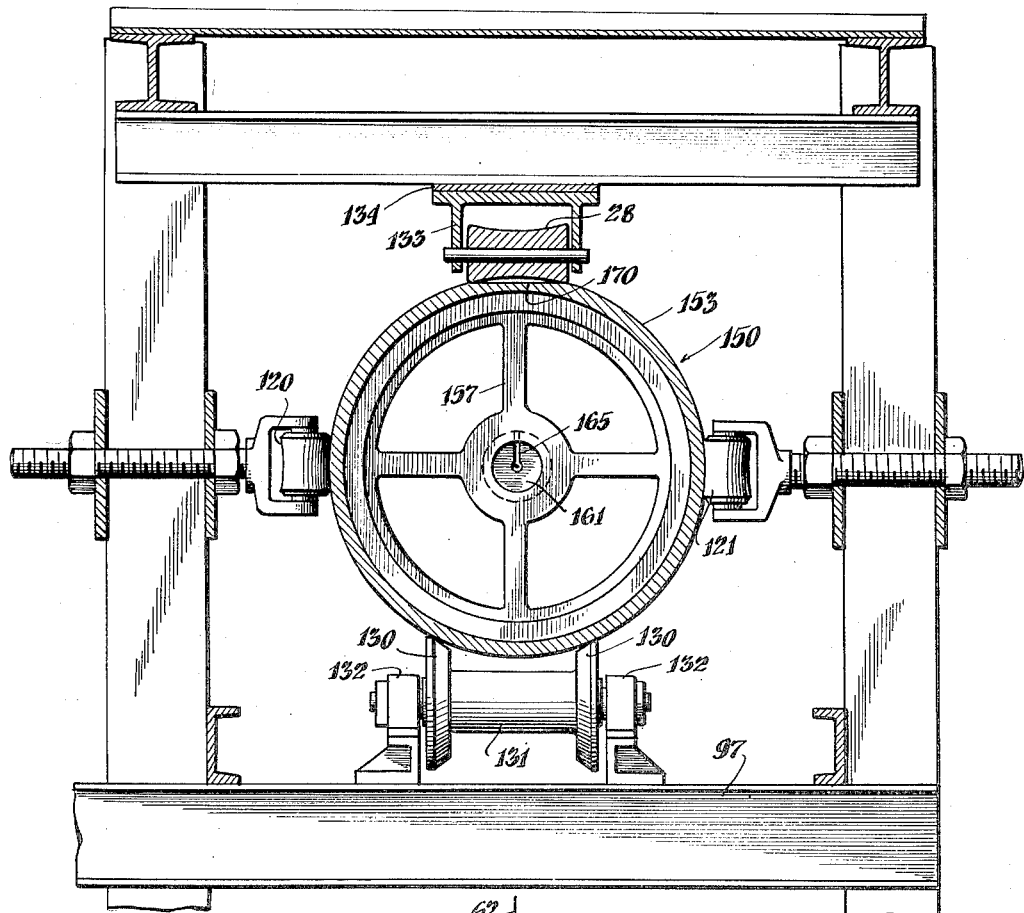
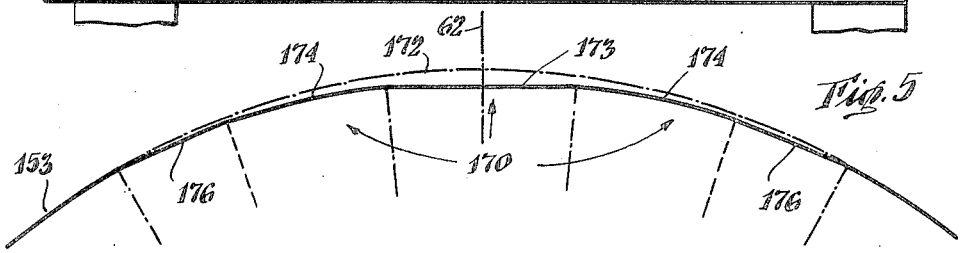
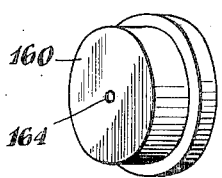 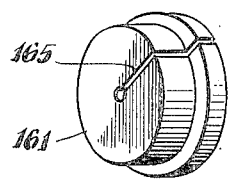
INVENTOR.
Frederic M. Darner
BY Robert S. Dunham
ATTORNEY Sept. 14, 1954          F. M. DARNER          2,688,804
ALIGNMENT MEANS FOR PIPE MANUFACTURING APPARATUS
Filed May 18, 1950          5 Sheets-Sheet 5
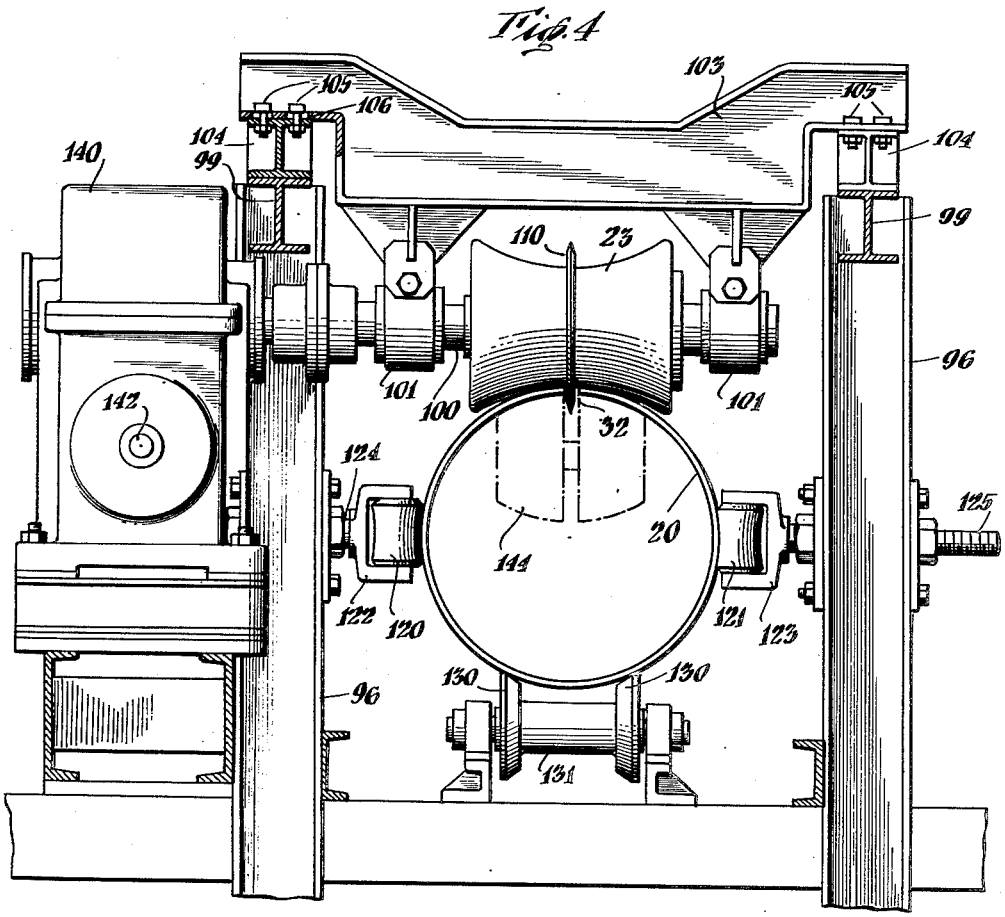
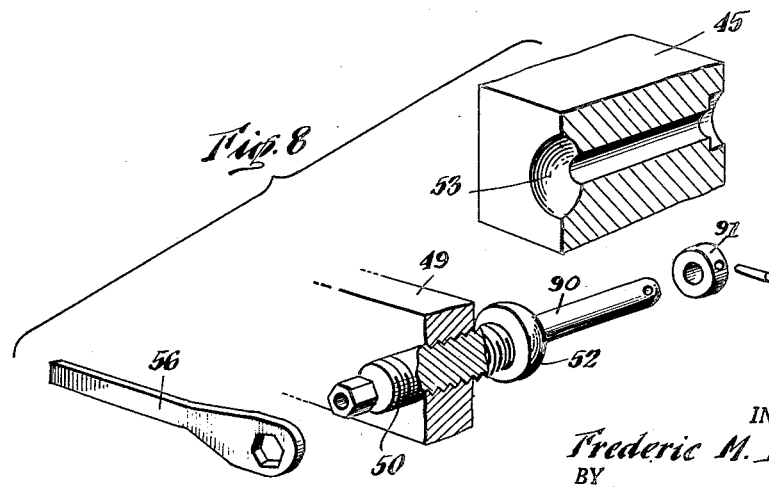
INVENTOR.
Frederic M. Darner
BY
Robert S. Dunham
ATTORNEY Patented Sept. 14, 1954

2,688,804

UNITED STATES PATENT OFFICE 2,688,804

ALIGNMENT MEANS FOR PIPE MANUFACTURING APPARATUS

Frederic M. Darner, Shaker Heights, Ohio, assignor to Republic Steel Corporation, Cleveland, Ohio, a corporation of New Jersey Application May 18, 1950, Serial No. 162,786

11 Claims. (Cl. 33—185)

This invention relates to alignment means and procedure for pipe manufacturing apparatus and the like, and particularly to such means and procedure whereby the various pipe-engaging or other working elements of the apparatus may be expeditiously adjusted and aligned for uniform, continuous production of pipe sections having desired dimensions and shape.

In an important specific aspect, the invention is related to the production of so-called large diameter pipe, for instance pipe made of steel, having a diameter of 20 inches to 30 inches, and a wall thickness of ⅛ to ½ inch, it being understood that the systems herein disclosed are nevertheless applicable to other pipe manufacturing arrangements, e. g. for making pipe having a diameter upwards of 6 inches or so.

One presently preferred example of a system for making large diameter pipe, involving apparatus and procedure which are described and claimed in the copending application of the undersigned (Frederic M. Darner) and Walter J. Caine, Serial No. 99,101, filed June 14, 1949, for Manufacture of Pipe, U. S. Patent No. 2,665,362, granted January 5, 1954, may be described briefly as follows. The pipe is made from large, flat sheets or plates of steel, called skelp, having a thickness of say $\frac{3}{16}$ to ⅜ inch. Each plate is first rolled to a cylindrical shape, with its longitudinal edges in close relation to provide a cleft that extends the length of the cylinder and that is to be welded to complete the pipe. These pipe blanks may be as much as 30 feet or more in length, and have a selected diameter in the range, say, of 20 to 30 inches, it being understood that for a given run of operations the equipment is set up to manufacture pipe of a single specific size as thus selected.

In the cleft-closing, aligning and welding apparatus, the pipe blanks are advanced in immediate, abutting succession, in a lengthwise direction (i. e. axially) along a straight line to and through a so-called welding chuck. As described and claimed in the cited application, the chuck embodies a multiplicity of sets of rollers, distributed circumferentially around the path of the pipe blanks, each set comprising a multiplicity of rollers arrayed lengthwise of the path of travel. The rollers are thus designed to engage the outer surface of the pipe blank and hold the latter in an extremely steady and substantially firm engagement while the blank progresses axially and while the welding means, at the chuck, welds a seam along the cleft.

The apparatus also includes a multiplicity of pipe-engaging elements which are intended to be aligned along the path of the pipe blanks as they advance to the chuck, these elements particularly including successive sets of pinch rolls turning on transverse axes, and contoured to fit a portion of the cylindrical pipe surface bridging the cleft, the outer roll of each set carrying a fin which penetrates the cleft and the fins of successive rolls being progressively narrower as the blanks approach the chuck. Cooperating guide rolls at the bottoms and sides of the pipe path (the pinch rolls being located at the top of the path, where the cleft line passes and also traverses the chuck) aid in compressing and directing the blanks so that as delivered to the chuck the cylindrical configuration is effectively maintained and the cleft is brought to a closed position, i. e. with its edges immediately abutting.

In the chuck, as explained, the cleft edges are held closed and the entire blank is secured against either local or over-all movement in any transverse direction, while the welding progresses. Further guide means are also provided (in this example of apparatus to which the present invention is applicable), including rollers engaging the interior of the pipe blanks at the chuck, and the internal rollers constituting the inner components of the respective pinch roll sets, all such means being supported by suitable ligaments and boom structure, i. e. ligaments projecting through the pipe cleft at localities where it is not yet fully closed. While these internal elements and their supporting parts can also be adjusted and aligned by the apparatus and procedure of the present invention (either directly, or indirectly, i. e. from the external devices), the illustration of the invention has been simplified herein by directing it only to the external working elements as examples.

It will now be appreciated that a very exact adjustment and alignment of all of the above-described elements, both in the chuck and along the path of advance of pipe blanks to it, must be established for accuracy and uniformity of pipe manufacture. A primary object of the invention is, therefore, to provide means and procedure for effectuating such alignment, in a novel and peculiarly satisfactory manner. A further object is to provide new and improved alignment structure, including means insertable into the chuck, for facilitating accurate positioning of the various working elements so that the manufactured pipe has the desired characteristics of strength, particularly in the welded seam along its cleft line.

It will also be appreciated that the skelp sheets are accurately cut to their tranverse dimension, which becomes the circumference of the pipe and which thus essentially determines the diameter of the pipe when the edges of the cleft are abutted squarely together for the seam welding operation. Hence the apparatus, especially the chuck, must be adjusted for exact conformity with the predetermined pipe circumference and diameter, and yet in such fashion that a firm and positive pressure is exerted on the pipe blank for the desired, essentially unyielding engagement of the blank as it travels along. In consequence a specific object of the invention is to afford novel means and arrangements to achieve such alignment of the chuck elements. A further object is to provide means in cooperation with the chuck aligning arrangement, for effectuating alignment of the several working means along the path of the pipe blanks remote from the chuck, i. e. including the various pinch rolls and guide rolls serving the purposes explained above.

Another and peculiarly important object of the invention is to provide means and procedure whereby, e. g. on suitable pre-setting of instrumentalities in the chuck, the portions of the blank at the edges of the cleft may be positively forced into a slightly non-cylindrical, i. e. flattened, shape which insures the complete, square abutment of the cleft edges and which likewise insures an essential uniformity of the cleft edge positions (e. g. against radial or lateral undulation or other transverse displacements) as the pipe blanks advance past the welding means. A further object is to provide a novel method of pipe manufacture involving such operation.

Other objects are to provide relatively simple, yet improved alignment apparatus and methods, permitting accurate and convenient alignment of a linearly arrayed series of working elements, and facilitating the set-up and positioning of the alignment devices as well as the actual adjusting and alignment operation.

To these and other ends, an important, presently preferred embodiment of the new structure and procedure is described below and shown in the accompanying drawings by way of example, i. e. to disclose illustratively the several features and principles of improvement.

Referring to the drawings:

Figs. 1A and 1B represent collectively in longitudinal view (i. e. upon joining the right hand side of Fig. 1A to the left hand side of Fig. 1B), and principally in longitudinal, central, vertical section, a pipe manufacturing apparatus of the character described above, with an embodiment of the novel alignment means of the invention disposed therein for the aligning operation;

Fig. 3 is a vertical section on line 3—3 of Fig. 1A;

Fig. 4 is a vertical section on line 4—4 of Fig. 1A;

Fig. 5 is an enlarged diagram showing, as if in transverse section, one example of a suitable contour for the top of the alignment cylinder;

Figs. 6 and 7 are perspective views of certain guiding members for an alignment wire, the members being inserted in the respective ends of the alignment cylinder as shown in Figs. 1A, 2 and 3;

Fig. 8 is an illustrative view, showing in simplified, perspective, exploded relation, the parts of certain adjusting means for the chuck device;

Figure 2:
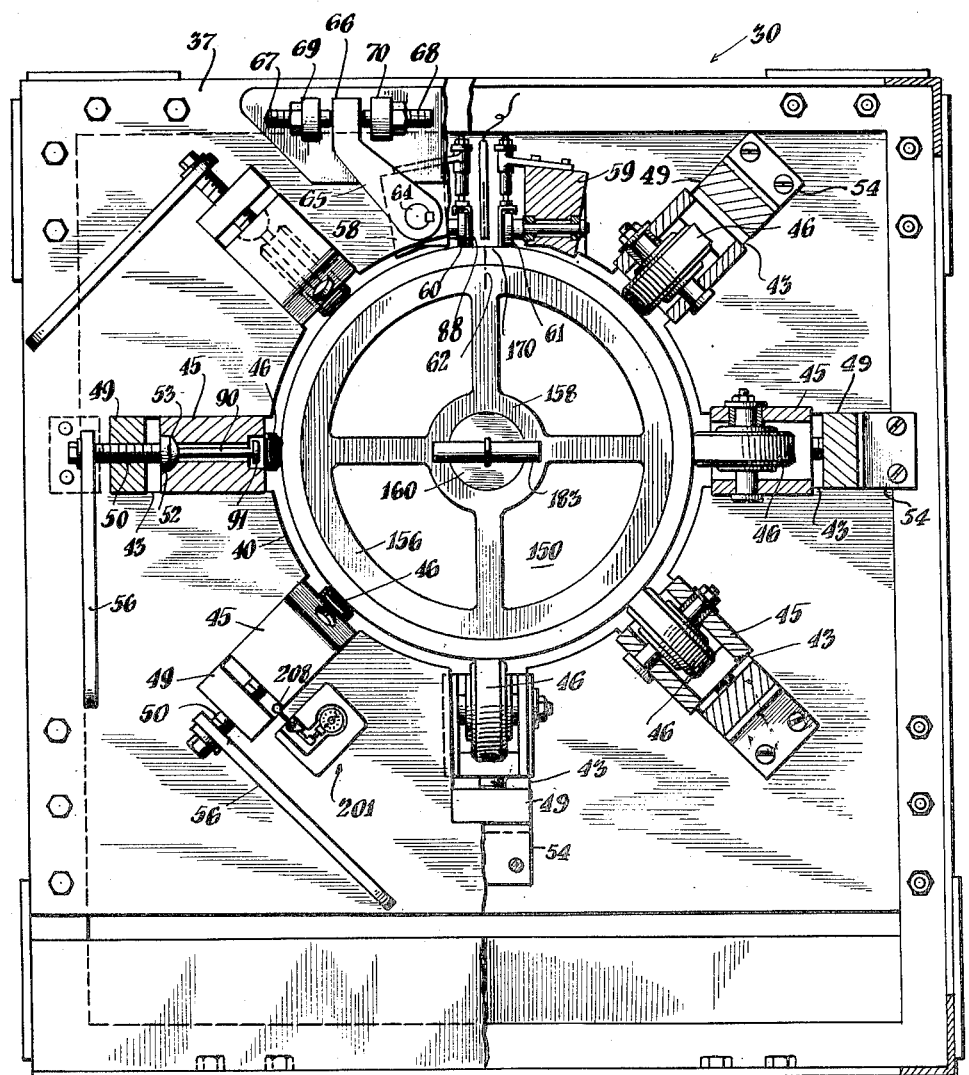
Fig. 2 is essentially an end elevation, taken from the left-hand end of Fig. 1A, showing the alignment cylinder of the invention in place in the chuck device, the latter being partly broken away in vertical section on successive planes.

The apparatus and procedure of the invention may be best understood by first describing the illustrated embodiment of pipe manufacturing apparatus in which they may be employed. Referring to Figs. 1A and 1B, the machine is designed to operate on successive pipe blanks (one such blank being indicated in dot-and-dash lines at 20), which progress axially from right to left in these views, past successive fin rollers that are generally designated 21, 22 and 23 and are mounted at longitudinally spaced localities in the upper part of a frame generally designated 25. After passing certain entry rolls arranged in two groups 28 and 29, the pipe blank traverses a chuck device 30 (see also Fig. 2), where a seam is welded along the cleft 32 (Fig. 4) at the upper side of the pipe blank by electrode means such as the pair of electrodes 33, 34 arranged in a longitudinal array and connected (through suitable means, not shown) so that welding arcs are struck from the electrodes to the pipe at the vicinity of the cleft.

The chuck 30 comprises a frame structure 36 carrying heavy end plates 37, 38 which are essentially identical, so that description of one will suffice for both. Thus the end palte 37 (Fig. 2) has a central aperture 40 somewhat larger than the circumference of the pipe blanks and provided with circumferentially spaced slots or notches 43 which accommodate and support respective roller cages 45, each cage 45 carrying a multiplicity of rollers 46 arranged in a longitudinal array lengthwise of the pipe path so as to bear on the surface of the pipe blank. Seated in the bottom of each slot 43 is a supporting bar 49, which, like the roller cages 45, projects beyond the outer face of the plate 37, as shown in Fig. 1A. Through the end of the bar 49 a bolt 50 is threaded, having a rounded head 52 which seats in a rounded depression 53 (see Fig. 8) at the rear face of the adjacent roller cage 45. The bars 49 being mounted securely in the notches, as by means of brackets 54 carried by the end plate 37, it will now be seen that upon turning up the bolt 50 with its associated wrench 56, the roller cage 45 may be adjusted toward the center of the opening 40, the bar 49, the bolt 50 and head 52 serving to back-up the cage for pressure of the rollers against a pipe blank traversing the chuck. As will now be appreciated, exactly similar mounting and adjusting means, designated by identical reference numbers, are provided adjacent the other end of each roller cage. i. e. at the vicinity of the plate 38.

While various numbers of roller sets (and various numbers of rollers in each) may be employed around the periphery of the pipe path in the chuck, the illustrated apparatus includes seven such sets, each with five rollers 46. These sets are spaced, as shown, around the pipe path, except at the top (adjacent the cleft) where other roller cages 58, 59 are disposed. The roller cages 58, 59 respectively carry a multiplicity of smaller rollers 60, 61 likewise arrayed lengthwise of the pipe path and mounted at the inner, facing sides of the cages so as to be disposed close to the cleft line, the position of the latter being indicated at 62 in Fig. 2.

The roller cages 58, 59 are mounted for rocking adjustment, to move the respective sets of rollers 60, 61 toward and away from the pipe surface. For example, the cage 58 carries at each end a stub shaft 64 appropriately journaled in the corresponding plate, e. g. the plate 37. The projecting end of the shaft has keyed to it an arm 65, which has an end portion 66 disposed between the spaced ends of a pair of aligned screws or bolts 67, 68, that are threaded in the mounting lugs 69, 70 on the plate 37 and are thus capable of being adjusted and locked, so as to hold the arm 65 (and the roller cage 58) in any desired angular position about the axis of the shaft 64. Thus the rollers 60, which are offset from the axis of the shaft 64, can be adjusted in a direction essentially normal to the surface of the pipe blank. It will be understood that similar means (with identical reference numbers) are provided at the opposite end of the chuck, i. e. adjacent the plate 38, for the other end of the cage 58, and that the ends of the cage 59 also have the same adjusting means, not here shown.

The chuck may also include a so-called register roller 80 (Fig. 1A) adapted to bear on the surface of the pipe blank in bridging relation to the cleft line, near the entering end of the chuck. The roller 80 is supported in a yoke device 81 which is pivotally mounted to the plate 38 at 82, off-center from the axis of the roller 80. The yoke 81 is adjustable about the axis 82 by a bolt 84 which is pivotally mounted to the yoke at 85 and traverses a vertical slot 86 in the end plate, wherein it may be secured in a desired position of adjustment by suitable lock nuts, as shown. The chuck device may include other means cooperating for efficient welding function on the pipe blank, for instance the flux shields 88 carried by the cages 58, 59 to prevent the loose granular flux, which is used along the weld, from escaping under the rollers 60, 61, these and other instrumentalities being more fully described in the aforesaid copending application Serial No. 99,101.

Thus the chuck comprises a multiplicity of peripherally distributed sets of longitudinally arrayed rollers, all adapted to bear compressively on the surface of the passing pipe blank, and each set being adjustable radially of the blank and adapted to be locked in adjusted position. While the cages 45 of the heavy rollers 46 are firmly backed up, against outward displacement, by the bolts 50, it will be appreciated that in normal operation the pipe blank obviates need for means to hold these rollers against inward displacement. However, to prevent the cages 45, especially the upper ones, from falling out of the slots 42 each of the bolts 50 has a stem 90 which projects loosely through a cooperating hole in the cage 45 and has pinned to it a retaining head 91 at the inner side of the cage.

The entire chuck is mounted on suitable supporting beam structure 93, as by bolts (not shown) and may be adjustable vertically by appropriate shims 95.

As indicated above, the framework 25 carries the successive fin rollers 21, 22, 23, for guiding and advancing the successive pipe blanks 20 to the chuck. The framework 25 includes spaced side posts or upright columns 96, bottom transverse beams 97, bottom longitudinal beams 98 and top longitudinal beams 99. As shown in Fig. 4, each of the fin rollers 21, 22 and 23, here represented by the roller 23, is carried on a shaft 100 which is supported in suitable bearings 101 that depend from a transverse beam 103 mounted on the upper longitudinal members 99. The beam 103 is spaced from the beams 99 by members 104, which may be selected in vertical dimension to provide vertical adjustment of the position of the fin roller 23, i. e. by removing any given pair of members 104 and substituting another pair of different size. Although in some cases adjustment can be made of the bottom or carrier rolls described below, a convenient practice is to leave them at a fixed elevation and to relate changes of pipe diameter to the position of the upper rollers 21—23. Thus the described adjustment by change of the members 104 is employed for change of pipe diameter, for instance to shift from 24" to 26" or 30" pipe, or other value. The lateral position of the roller 23 is adjustable by shifting the beam 103 laterally, i. e. to the right or left as seen in Fig. 4, before the bolts 105 are tightened to secure the beam 103 in place. It will be noted that the bolts may traverse suitable slots in the beam, e. g. as shown at 106, to permit such adjustment. The roller 23 is concavely contoured to fit the external surface of the pipe 20 and carries a central, disklike fin 110 which penetrates the cleft 32 of the pipe.

It will now be understood that the other fin rollers 21, 22 are of similar arrangement and identically mounted, the rollers 22 and 21 carrying respective fins 110a and 110b. For appropriate cleft-closing effect, the fins 110b, 110a and 110 may be progressively thinner, i. e. with the fin 110 the thinnest of the group.

For cooperative engagement with the pipe blanks, pairs of opposing side rollers 120, 121 are provided at spaced localities along the path of pipe advance to the chuck, e. g. at the upright columns 96 intermediate the localities of the fin rollers 23, 22, 21. The rollers 120, 121 are journaled in suitable yokes 122, 123 respectively carried by threaded studs 124, 125 which project through supporting plate structure and which can be locked in any position of adjustment toward the pipe by suitable lock nuts as shown, vertical adjustability being provided, if desired, by alternative holes or slotted openings (not shown) for the mounting means. In the illustrated machine, four such sets of side rollers are provided, respectively in advance of the fin rollers, between successive fin rollers, and between the last fin roller 23 and the chuck 30.

At the same localities there are also bottom or carrier rolls 130 (Figs. 3 and 4) which comprise spaced roller members, cast integrally with a central hub or shaft portion 131 and journaled in upright supports 132 that are mounted on the cross member 97. In a yoke 133 depending from mounting means 134, 135 (Figs. 1A and 3) adjustable similarly to the rolls 21—23, the entry rollers 28, 29 are arranged to bear on the top surface of the pipe blank, in bridging relation to the cleft, as the blank passes from the last fin roller 23 through the last set of side rollers 120, 121 and bottom rolls 130, into the chuck 30. The entry rolls 28, 29 serve to maintain the edges of the cleft under downward compression, to promote the closing effect and to guide the upper surface of the pipe blank more effectively into the chuck device. As shown there are a multiplicity of these rolls, arranged lengthwise of the pipe path and arranged in spaced sets 28, 29.

It may be explained that the fin rollers 21, 22, 23 are positively driven at identical speeds by a motor drive and gear mechanism generally indicated at 140 in Fig. 4, each roller being thus turned by gearing (not shown in detail) from a common longitudinal shaft 142. As more particularly described in the above identified application Ser. No. 99,101, each fin roller is accompanied by a cooperating convex roller carried inside the passing pipe blank, so as to provide a set of pinch rolls for effective transmission of power to the blank. Simply for illustration, one such inner roll is indicated at 144 in Figs. 1A and 4, like rolls being provided for the other fin rollers 21 and 22, and each being supported in compressive relation to the outer fin roller by suitable ligament means (not shown) extending through the open cleft of the pipe blank. As indicated hereinabove, the apparatus also comprises further instrumentalities (not shown) supported by a boom inside the pipe blanks at the region of the chuck, including pressure and register rollers cooperating with the roller 39 and the roller 46 directly below it.

Except for the driven rollers 21, 22 and 23 (which furnish the power to advance the pipe blanks through the chuck), all rolls or rollers in the illustrated apparatus are mounted for free rotation, to roll on the surface of the pipe blanks in firm, more or less compressive engagement.

To obtain proper, uniform operation, a very accurate alignment is required, not only of the rollers in the chuck with respect to the desired pipe circumference, but also of the several fin rollers, side rollers, carrier rolls and entry rolls whereby the pipe blanks are guided and advanced into the chuck, along the designated straight line path.

For such purpose the apparatus of the present invention includes an alignment cylinder generally designated 150, adapted for insertion in the chuck 30 and comprising a rigid, hollow, cylindrical shell 152, e. g. of cast iron or the like, which has an outer cylindrical surface 153 (Figs. 1A, 2 and 3) having the exact radius desired for the outer surface of the pipe to be manufactured. The cylinder 152 should be an entirely rigid structure, for example, having internal, annular ribs 154 for reinforcement. Of the latter, the outermost ribs or flanges 154a, 154b, are spaced slightly inward from the ends of the cylinder to provide corresponding recesses for the insertion of end spider devices 156, 157, which thereby span the ends of the cylinder 152.

The spiders 156, 157, which fit tightly in the ends of the cylinder 152 and are there secured by appropriate screws or other means, not shown, against the flanges 154a, 154b, have central hubs 158, 159, that are provided with circular openings adapted to seat the corresponding, removable plugs 160, 161. For accurate positioning of the plugs in the hubs, each hub opening has a shoulder as indicated at 162 and 163 against which a corresponding flange portion of the plug is adapted to fit. For traversal by an alignment wire, as more fully described below, each plug is appropriately apertured. Thus the plug 160, at the left hand end of the cylinder 152 (Fig. 1A), has a small central opening 164 disposed to lie exactly on the axis of the cylinder. The plug 161 has a narrow slot 165 extending radially from its periphery to the center, i. e. so that a wire seated at the base of the slot will be located at the axis of the cylinder. In consequence, when the plugs 160, 161 are fitted in the hubs 158, 159, the hole 164 and the base of the slot 165 are aligned very precisely along the cylinder axis.

Although for some purposes it is feasible to employ an alignment cylinder having a length not essentially greater, or perhaps even slightly less, than the length of the chuck (which itself is preferably longer, i. e. axially of the pipe, than the diameter of the pipe), a peculiarly effective arrangement is as shown, wherein the cylinder is substantially longer than the chuck so that it also fits within adjacent pipe-engaging elements exterior to the roller assemblies of the chuck, viz. certain of the entry rolls 28 with the cooperating set of side rolls 120, 121 and carrier rolls 130.

While in some cases the alignment device 150 may have a simple, completely cylindrical contour, a special feature of the invention is the inclusion of a flattened region 170 along one side of the cylinder, e. g. the side which is turned uppermost when the device is inserted in the chuck as shown. This flattened region, having a width of, say, several inches (i. e. transversely, along the circumference of the cylinder) permits adjustment of the upper sets of pipe-engaging rollers 60, 61, to a position slightly inward of a truly cylindrical surface for the passing pipe blanks. That is to say, when the alignment device 150 is inserted in the chuck and the several roller cages 45 have been adjusted to the truly cylindrical portion of the surface, the cages 58, 59 are adjusted so that their rollers 60, 61 bear on the flattened or depressed portion of the cylinder. Then upon removal of the cylinder and operation of the equipment to weld a seam along a pipe blank that is traversing the chuck, the rollers at the upper part of the chuck, viz. the rollers 60, 61 and the register roller 80, effectuate or maintain a slight bending or distortion of the skelp inward at the regions adjacent the cleft edges, not only to bring the edges more squarely together but especially to provide uniformity and completeness of their registration.

While the flattened section 170 may merely comprise a flat, plane portion machined as such along one side of the cylinder, i. e. as if defined by a simple chord moved axially of the cylinder (such arrangement being indicated for simplicity and clarity in Figs. 2 and 3), Fig. 5 shows a somewhat preferable contour, which cooperates better (than as actually seen in Fig. 3) with the entry rolls 28 and 29 for setting the latter to effect preliminary flattening or distortion of the pipe blank moving into the chuck. In Fig. 5 the true cylindrical surface, i. e. of circular cross-section, is indicated at 172, while the reduced or generally flattened portion 170 comprises a plane center section 173, bordered by curved sections 174, 174 (each having a radius, say, slightly less than the radius of the cylindrical surface 153—172), the regions 174 being in turn bordered by flat or plane areas 176, 176, which merge into the true cylindrical surface 172. The outer edges of the entry rollers 28, 29 then bear on the regions 174 when the cylinder 150 is disposed beneath such rollers.

By way of example, for manufacture of pipe having a diameter of 24 inches to 30 inches and for an alignment cylinder having a diameter correspondingly selected in such range, the width of the plane center section 173 may be 3 inches, and the entire transverse width of the reduced or cutback region, i. e. including also the sections 174 and 176 on either side, may be equivalent to a chord, say of 11 to 12 inches. In the specific example of apparatus illustrated, the flattened or reduced section does not extend to the region of the roller sets 46 (Fig. 2) which most nearly adjoin the rollers 60, 61.

The central flat portion 170 is designed to bridge the cleft line and to be abutted by the rollers 60, 61, although it will be appreciated that other embodiments of the equipment may be such that the sets of rollers immediately adjacent the cleft abut a slightly curved rather than plane portion of the reduced-radius region. Indeed in some cases the contour of the so-called flat portion 170 need not actually include a truly plane surface at all, but may simply consist of a continuous, flattened curve following a line suitably spaced below the circular boundary 172 (Fig. 5) across the cleft line region 62.

As intimated above, the apertures in the end plugs 160, 162 are designed to pass a guiding or aligning member such as the wire 180, which may extend the entire length of the apparatus as indicated in Figs. 1A and 1B. Such wire is preferably steel or like material having as little extensibility as possible when it is stretched taut, particularly satisfactory structure being constituted by so-called piano wire, say of No. 22 gauge. Both the hole 164 and the slot 165 are designed to fit the wire rather closely, the only exception being that in some cases, a slight looseness of the wire in the bottom of the groove 165 may facilitate accuracy in determining whether and when the wire has been stretched into as nearly perfect a straight line as possible, i. e. a straight line which is continuous from the inside to the outside of the cylinder. As shown in Figs. 1A and 2 one end of the wire is fastened to an appropriate bar or stop 183 which abuts the outer face of the plug 160 and hub 158 and thus constitutes with the plug, appropriate supporting means for the wire, against lateral displacement to the right as seen in Fig. 1A.

At the opposite end of the apparatus, e. g. on the pipe entering side of the first-reached side rolls 120, 121 and carrier rolls 130, means are temporarily provided for mounting and retaining the corresponding, opposite end of the wire 180. While any of various suitable arrangements may be employed, the drawings show, simply for illustration, an upright member 185 temporarily affixed in vertical relation at the end of the frame 25, the member 185 serving to mount a wire retaining member 187, which may have a central portion traversing a slot 188 in the member 185. The device 187 is thus mounted for appropriate adjustment so that its central aperture 190 designed to admit the end of the wire 180 with a reasonably close fit, may be shifted to a position of precise alignment with the opening 164 and the bottom of the slot 165 in the central plugs of the alignment cylinder. A retaining bar or member 192 may be fastened at the end of the wire 180, i. e. after the latter has been stretched into place, so as to hold the wire in a fully taut relation.

It will be appreciated that the arrangement 185—192 just described is only mounted temporarily to constitute a supporting means for the outer end of the wire 180, and is removed along with the wire, when the latter has served its alignment function. Indeed, it may be explained that where there are further pipe entering or guiding rollers, e. g. further bottom rollers 130 along which the blanks are brought up to the particular apparatus shown, the wire supporting means may be located correspondingly further to the right than as appears in Fig. 1B. In such fashion, the further pipe-engaging elements may similarly be aligned to and with the wire 180.

While other specific procedures may be followed in effectuating alignment of the pipe manufacturing equipment while still taking advantage of certain essential features of the invention, a particularly convenient mode of operation is as follows. With the external pipe-engaging elements arranged generally as shown (internal parts such as the rollers 144 being temporarily removed), the chuck roller cages are roughly adjusted to a cylindrical alignment, slightly larger than the outer surface 153 of the cylinder or dummy workpiece 150. Thereupon the cylinder is inserted into the chuck, i. e. to the full line position indicated in Fig. 1A, with the right-hand end of the cylinder projecting into the space surrounded by the entry rolls 28 and the immediately adjacent set of the rollers 120, 121 and 130.

The upper or flattened section of the cylinder 150 is disposed in bridging relation to the desired cleft path through the chuck. Proper centering of the flattened region may be achieved by aligning a center mark (not shown) at the end of the cylinder, in truly vertical relation to the central hole of the plug 160, or by other suitable procedure.

Thereupon, the roller sets of the chunk are adjusted, as by turning down on the wrenches 56 so as to advance the cages toward the axis of the path of pipe advance, and by adjusting the bolts 67, 68 for the roller cages 58, 59 to rock the rollers 60, 61 in a corresponding direction. The adjustment is effectuated to bring all of the rollers into full compressive arrangement with the outer surface of the cylinder, while making any necessary mutual adjustment of one end of any roller cage relative to another, so as to keep the cylinder truly level. Corresponding adjustment may be simultaneously made of the rollers 28, 120, 121 and 130 which abut the cylinder surface near its right-hand end as seen in Fig. 1A; indeed where the latter group of rollers may be more or less fixed against rapid or other than step-by-step adjustment, the adjustment of the chuck roller sets may be such as to align them, on the dummy or cylinder device 150, with the rollers 28, 120, 121 and 130. It will be understood that however actually adjusted, the hypothetical cleft line (which may, if desired, be scribed along the center of the flattened top portion of the cylinder 150) is maintained in appropriately centered relation to the register roller 80 and halfway between the two sets of rollers 60, 61.

After all of the rollers 46, 60 and 61 have been tightened against the cylinder 150, i. e. to the extent desired for firm compressive yet rolling engagement with a successive pipe blank, and after the nearest external rollers 28, 120, 121 and 130 are likewise adjusted as necessary, the cylinder device may be moved backwards, i. e. to the right as shown in Fig. 1A, until the dotted line position 150a is reached, where further adjustment of the entry roll supporting means may be made as necessary, i. e. to adjust the rollers 29. Hence, by these operations a true and accurate alignment of all of the chuck rollers is effected, along with like adjustment of the last group of pipe-engaging means external to the chuck, including all of the entry rolls which bridge the cleft and bear upon the adjacent portions of the pipe blank surface as the blank is advanced into the chuck.

At this or at any earlier desired stage in the proceedings (and with the cylinder 150 retracted to its full line position, Fig. 1A) the elongated alignment member, viz. the wire 180, may be installed, e. g. by threading it through the aperture 164 (while securing its left-hand end by the member 183) and by thereupon carrying the wire along through the opening in the hub 159, at the right-hand end of the cylinder as seen in Fig. 1A. Most conveniently, the plug 161 may have been removed before the wire is run through the cylinder. The remote end of the wire is temporarily fastened at the vicinity of the most remote, entering portion of the machine where alignment is desired. Thereupon the plug 161 is disposed on the wire, sliding the latter to the bottom of the slot, and is then pressed into place in the hub 159, preferably with the slot extending upwardly so that the wire may be supported underneath by the bottom of the slot. Finally, adjustment of the structure 187 or other mounting means at the remote or entering end of the apparatus is then effectuated, while tightening and fastening the wire at such locality (as by the device 192), all in such fashion that the wire 180 is stretched completely taut, both internally and externally of the cylinder and lies in a single, continuous, straight line (or as nearly such as possible) on the cylinder axis, all the way from one end of the wire at 183 to the other end at 192. Indeed the adjustment of the remote supporting means 187 may be such that the wire is just barely lifted from seating against the bottom of the slot 165, thereby insuring the most nearly perfect leveling of the wire.

When so placed the wire 180 provides a continuous guide line throughout the entire machine, and all of the remaining pipe-engaging elements are now adjusted in alignment with it. For instance, the several pinch rolls 23, 22, and 21 are positioned so that their central fins 110, 110a, 110b are exactly above the wire and so that the concave surfaces of the rolls are at precisely the desired distance to fit the pipe blank. Like adjustment of the various other rollers 120, 121 and 130 may also be made as and if necessary, i. e. to measured positions relative to the wire where these rollers will suitably abut the external surface of the passing pipe blanks. With the various elements, especially rolls 21—23, thus properly positioned, various internal parts such as the rollers 144 (and their supporting ligaments, not shown, that traverse the pipe cleft) need only be installed in their intended relation to the rolls 21—23, after the wire is removed, such parts then naturally assuming proper positions of alignment.

Upon completion of all these adjusting and alignment operations, the wire and cylinder are removed from the apparatus, together with any temporary supporting means such as indicated at 185. Assuming that all internal parts have been installed, the apparatus is then ready for operation upon successive pipe blanks, e. g. as introduced endwise through the right-hand end of the device seen in Fig. 1B. As the long pipe blanks are thereafter inserted, with their clefts uppermost for penetration by the fins 110b, 110a, 110, the pinch rolls driven by their respective constituent rollers 21, 22, 23, advance each pipe blank, while guiding the cleft line in the proper direction, toward and into the chuck device. As explained above, the progressively smaller width of the fins, together with the compressive effect of the side and bottom rollers, causes the cleft to move to a closed position as it advances into the chuck, the engagement of the preliminary rollers 29, 28 and especially the engagement of the multiple sets of rollers in the chuck itself, serve to complete the firm closure of the cleft for the welding operation.

Figure 9:
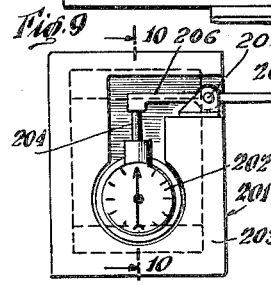
Fig. 9 is an elevation of a supplemental indicator device shown in use in Fig. 2.
Figure 10:
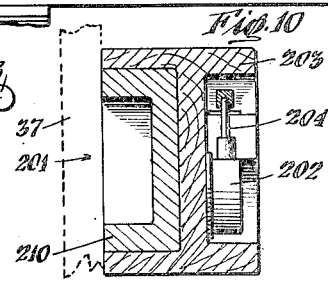
Fig. 10 is a section on line 10—10 of Fig. 9.

Since the physical dimensions of the pipe blank can vary because of stiffness of the skelp, variations in gauge, and other factors, all pipe blanks coming to the machine are not of exact uniform periphery; for instance, significant changes in this respect may occur between successive lots of pipe blanks intended to have the same diameter. In order to maintain the alignment established by the foregoing procedure and still be able to have the chuck rollers 46 in properly tightened relation against the pipe, device 201 shown in Figs. 9 and 10, and illustrated in use in Fig. 2, is employed to gauge the amount of tightening or loosening of the rollers as obtained by the turning of the screws 50 for fine adjustment of the roller cages 45.

The device 201 comprises a dual indicator 202, for example graduated in thousandths of an inch, and mounted in a wooden block 203, the indicator 202 being of a conventional type adapted to indicate the axial displacements of its stem 204. A lever 206 bears at one end on the stem of the indicator and has a fulcrum pivot 207 in the block 203, so that displacements of the outer end 208 of the lever may be read on the dial of the indicator, the end 208 of the lever being ball shaped or otherwise curved to facilitate reasonably accurate attainment of a given ratio, say one-to-one, in the use of the lever. A permanent magnet 210, preferably U-shaped is embedded in the rear face of the block 203, to hold the device firmly against the steel end plate 37 (or 38) of the chuck.

Thus when the operator wishes to make a measured, fine adjustment of one of the roller cages 45, he first places the device 201 against the selected end plate, e. g. the plate 37, with the end 208 of the lever 206 engaging the outside face of the cage 45, as shown in Fig. 2. The magnet holds the device in the position in which it is thus manually located. The graduated dial of the indicator 202 is then adjusted to the zero position in relation to its hand. The desired adjustment of tightening or loosening the screw 50 can now be made, while the operator reads directly from the indicator the amount of movement of the cage 45 that has taken place. On completing such adjustment of the selected cage, the operator removes the device 201 simply by firmly pulling it away from the plate, against the magnetic attraction. By the use of this device a uniform adjustment can be made throughout the entire chuck in order that all parts may be maintained uniformly on the center line. For example, after the chuck has been originally adjusted to the alignment cylinder 150 it may be found that the first or some later series of pipe blanks departs slightly in diameter from the cylinder; with the device 201, all the roller cages can be adjusted in the necessary direction to an extent easily made uniform by the provided measurement, and the measured change can also then be effected in the chucks of any companion machines that may be used.

By virtue of its adjustment to the precise external contour of the rigid cylinder 150, and further fine adjustment if necessary (as just described), the chuck grips the pipe blank with suitable compressive force, holding it absolutely steady and in the desired contour and dimension, while it progresses endwise, i. e. from right to left in Fig. 1A, and while the welding operation is performed by the electrodes 33, 34.

A principal feature of the present improvements is the adjustment of the roller sets 60, 61, to a position slightly below a truly cylindrical surface. While the preliminary formation of the skelp into the cylindrical blank is designed to provide as close to a truly cylindrical shape throughout the blank as possible, minor variations or departures from such shape are apt to occur at the vicinity of the cleft edges, departures which may even vary from one end to another of a given blank. Ordinarily these departures are in an outwardly flaring direction, i. e. so that the edges of the cleft are very slightly further from the cylindrical axis than the selected radius, but in some blanks or places on them there may also be a slight flattening at one or both of the cleft edges. The preferred adjustment of the rollers 60, 61, and thus the preferred contour of the dummy cylinder 150 is therefore such as to afford a flattening slightly greater than that to be expected or normally tolerated in the range of inherent distortion in the formed blanks. Hence as the pipe blank traverses the chuck, and regardless of the inherent shape of its cleft edges, the latter are uniformly pressed down, i. e. under positive compressive stress at all times, so that by their own stiff resilience they are always forced into firm engagement with the rollers 60, 61. In consequence the edges are kept uniformly and constantly at the level defined by the rollers, with the result that an absolutely uniform, even and exact registration of the edges is maintained during the welding operation.

By this mode of operation and by the cooperating employment of a multiplicity of small, closely spaced rollers along the cleft edges (to prevent undulatory movement) all motion of either or both of the cleft edges is essentially prevented during the welding operation and indeed during the entire traversal of the pipe blank through the chuck. It will be understood that the length of the chuck, i. e. along the path of pipe advance, is preferably such that the weld is fully solidified and set by the time it emerges at the left-hand or exit end of the chuck, the described holding action of the rollers being maintained throughout this interval. In consequence a strongly and uniformly welded pipe is always produced.

It may be explained that in one present type of operation, the weld actually effected by the electrodes 33, 34, penetrates only part of the way through the cleft, e. g. somewhat more than half the thickness of the skelp. The inner portions of the cleft edges are fully and squarely abutted, however, and upon being subjected to a second, inner welding operation in supplemental equipment (not shown), a complete, welded seam is effected on the inside as well as the outside of the pipe.

It will now be appreciated that the method and apparatus of the invention afford convenient alignment of pipe manufacturing equipment and likewise afford a highly accurate and uniform method of pipe manufacture. The aligning operation is not only facilitated to the point of unusual accuracy but can be carried out with relative ease and in a relatively short time. All of these are manifest advantages, particularly where the apparatus may have to be re-set every so often, i. e. to take account of replacement of worn rollers, as well as for the more extensive adjustment or replacement of parts needed in changing over to the manufacture of a different diameter of pipe. Although it will now also be appreciated that procedure and apparatus of the sort described can be used for adjustment of other types of equipment wherein a plurality of work-engaging elements are to be aligned along a predetermined straight line path, the described objects and advantages are realized to an unusually complete extent in systems of the character shown for manufacturing large diameter steel pipe by welding a seal along a cleft in long, tubular blanks.

It is to be understood that the invention is not limited to the specific devices and methods herein illustrated and described, but may be carried out in other ways without departure from its spirit.

I claim:

1. Alignment means for pipe manufacturing apparatus wherein successive, elongated, tubular-shaped pipe blanks are to be advanced lengthwise along a straight line, said pipe manufacturing apparatus including a chuck at the outgoing end of said line, having a plurality of circumferentially spaced, radially adjustable, pipe-engaging elements, and said apparatus including a plurality of pipe-engaging elements distributively spaced along said line between said chuck and the incoming end of the line, and all of said elements being adjustable transversely of the line, comprising, in combination, an alignment device having a length at least as great as the chuck and having an outer substantially cylindrical surface congruent with the desired tubular shape of the pipe, said alignment device being insertable in the chuck for adjustment of the pipe-engaging elements of the latter, to conform with said last-mentioned tubular shape, a length of wire having a length equal to a plurality of times the length of the alignment device, to be stretched along said line so as to pass the chuck and all of the aforesaid other pipe-engaging elements, means disposed on the axis of said substantially cylindrical surface for guiding the wire in the precise direction desired for said straight line, said guiding means supporting the wire at the chuck, and means also disposed on the axis of said substantially cylindrical surface at a locality remote from the alignment device, for supporting the wire at the incoming end of the line, with the wire stretched along said straight line as directed by the guiding means.

2. Alignment means as described in claim 1, for pipe manufacturing apparatus wherein the chuck has a multiplicity of circumferentially distributed, radially adjustable sets of rollers, each set comprising a multiplicity of rollers longitudinally arrayed along a predetermined portion of the path of the pipe blanks, said alignment device having a length substantially greater than the length of the chuck as defined by the aforesaid portion of the pipe blank path, the length of the alignment device being sufficient for its said outer surface to be engaged by another adjustable pipe engaging element external to the chuck and spaced therefrom along the aforesaid line, while the alignment device is fully inserted in the chuck.

3. Alignment means for pipe manufacturing apparatus wherein successive, cylindrical pipe blanks are to be progressed axially along a straight line, said apparatus including a chuck at the outgoing end of the line and a plurality of pipe-engaging means distributively spaced along the line between the chuck and the incoming end thereof, said chuck including a plurality of pipe-engaging means distributively spaced around the circumference of the pipe blank, and all of the aforesaid pipe-engaging means being adjustable transversely of the line, comprising an alignment cylinder having the desired, predetermined cylindrical configuration of the pipe to be made and adapted to fit in the chuck for adjustment of the pipe-engaging elements thereof into conformity with said cylinder, a length of wire adapted to extend throughout the path constituted by said straight line, means in the cylinder, adapted to be traversed by the wire, for guiding the same along the said line at localities spaced lengthwise of the line, said guiding means being adapted to support the wire in the alignment cylinder while the same is disposed in the chuck, and means adjacent the incoming end of the line, for there supporting the wire, to maintain the latter along the line as directed by the guiding means in the alignment cylinder.

4. Alignment means as described in claim 3, wherein the guiding means of the alignment cylinder comprise a pair of guiding members removably seated in the respective ends of the cylinder and apertured to guide the wire at corresponding predetermined points disposed centrally of the ends of the cylinder.

5. Alignment means as described in claim 4, wherein one of the members, adapted to be disposed in the end of the cylinder nearest the incoming end of the aforesaid line, has a slot extending radially through the periphery thereof, so that said slotted member, being removed while the wire is inserted through the other of the guiding members, may be thereafter fitted around the wire and into seated relation in the cylinder.

6. Alignment means as described in claim 3, for large diameter pipe manufacturing apparatus wherein the chuck has a multiplicity of circumferentially distributed, radially adjustable sets of rollers, each set comprising a multiplicity of rollers longitudinally arrayed along a portion of the path of the pipe blanks which is longer than the diameter of the pipe, and wherein the nearest of the other pipe-engaging means to the chuck comprises a plurality of rollers distributively adapted to embrace the pipe blank, said alignment cylinder having a length substantially greater than the length of the chuck as defined by the aforesaid portion of the pipe blank path, the length of the alignment cylinder being sufficient for its surface to be engaged by the rollers of said nearest of the other pipe engaging means external to the chuck while the alignment cylinder is fully inserted in the chuck.

7. Alignment means as described in claim 3, for pipe manufacturing apparatus wherein a longitudinal cleft in each pipe blank is progressively welded as the blank traverses the chuck, the aforesaid pipe-engaging means of the chuck including members to engage the pipe blank on both sides of the cleft immediately adjacent thereto, and including other members engaging the pipe blank at distributively spaced localities around its circumference, the aforesaid alignment cylinder having a flattened region extending lengthwise along one side, said cylinder being adapted to be disposed in the chuck with said flattened region bridging the path to be followed by the cleft of the pipe blanks, whereby the pipe engaging members adjacent said cleft path may be adjusted in conformity with said flattened portion, so that in subsequent operation relative to pipe blanks, they tend to flatten each blank correspondingly adjacent the cleft line.

8. Alignment means for pipe manufacturing apparatus wherein successive pipe blanks are advanced past a plurality of pipe-engaging means, one of said means being a welding chuck, comprising a rigid alignment cylinder having the radial and circumferential dimensions of the pipe to be manufactured from the pipe blanks, said cylinder being insertable in the chuck for alignment of the latter to feed the cylinder, and said cylinder including wire-guiding structure at localities thereof spaced in an axial direction, said wire-guiding structure being thereby adapted to receive and guide a length of wire, which may be stretched from the cylinder for alignment of other pipe-engaging means of the apparatus, said wire-guiding structure comprising a pair of alignment means spaced longitudinally of the cylinder, adjacent the respective ends thereof and each provided with a wire-guiding aperture at the axis of the cylinder, and one of said alignment means comprising a member removably seated in the end of the cylinder, said member having a slot extending radially through its periphery to constitute the wire-guiding aperture, the inner end of the slot being disposed to be located at the axis of the cylinder when the said member is seated therein, and said member being thus adapted to be moved into place around the wire and into the cylinder after the wire has been passed through the cylinder.

9. Alignment means for a multiplicity of working elements which are adapted for successive operations on elongated workpieces that progress lengthwise along a straight line and that are to have a predetermined, characteristic transverse shape to which a set of the working elements at one locality of the line must be adjusted radially of the workpiece in a plurality of directions circumferentially spaced about said workpiece, comprising a dummy workpiece having the aforesaid predetermined transverse shape and having a length at least sufficient to accommodate all of the working elements of said set, said dummy workpiece being insertable in said set of the elements for adjustment of the latter radially to fit the dummy workpiece, an elongated alignment member, sufficiently longer than said dummy workpiece to extend past all of the aforesaid multiplicity of working elements along the line, said dummy workpiece having supporting and guiding means for the alignment member, adapted to engage the same at a plurality of localities spaced lengthwise of the member, for supporting and aligning the alignment member in a predetermined direction relative to the dummy workpiece and parallel to the aforesaid straight line to define the latter, and means for supporting the alignment member, so aligned, at a locality remote from the dummy workpiece, so that all of the working elements other than those in the set may be adjusted in conformity with said alignment member.

10. The alignment means described in claim 9, wherein the alignment member comprises a length of wire and the supporting and guiding means in the dummy workpiece comprises members rigidly secured in said workpiece at localities longitudinally spaced thereof and providing close-fitting guiding apertures for said wire, said wire traversing the guiding apertures.

11. Alignment means as described in claim 10, wherein one of the last-mentioned, apertured members is a member removably seated in the workpiece and having its aperture constituted by a radial slot, so that the said slotted member may be removed while the wire is being inserted through the other of the apertured members and passed through the dummy workpiece, and so that said slotted member may be thereafter fitted around the wire and into the dummy workpiece.

References Cited in the file of this patent

UNITED STATES PATENTS

| Number | Name | Date |
|---|---|---|
| 458,055 | Hunt et al. | Aug. 18, 1891 |
| 1,033,648 | Winkle | July 23, 1912 |
| 1,285,328 | Neuberth | Nov. 19, 1918 |
| 1,452,824 | Bosworth | Apr. 24, 1923 |
| 1,808,816 | Johnson | June 9, 1931 |
| 2,000,476 | Schmidt | May 7, 1935 |
| 2,000,789 | Reis | May 7, 1935 |
| 2,054,359 | Bruckshaw | Sept. 15, 1936 |
| 2,268,368 | Anderson | Dec. 30, 1941 |
| 2,437,160 | Johnson | Mar. 2, 1948 |
| 2,526,723 | Berkeley | Oct. 24, 1950 |
| 2,595,910 | Wallace | May 6, 1952 |
| 2,639,513 | Ricord | May 26, 1953 |

FOREIGN PATENTS

| Number | Country | Date |
|---|---|---|
| 195,013 | Great Britain | Mar. 22, 1923 |
| 121,646 | Sweden | Mar. 11, 1948 |

OTHER REFERENCES

Publications: Automobile Trade Journal and Motor Age, June 1929, note the Ames advertisement on page 257. (Copy in 33-172A.)

Published article entitled "Optical Alignment Tool," in The Journal of the Society of Motion Picture Engineers for August 1933, vol. 21, pages 94-96, inclusive. (Copy in Library.)

Popular Mechanics, January 1944, page 129.